United States Patent
Gordon

[15] 3,643,371
[45] Feb. 22, 1972

[54] INSECTICIDE APPARATUS

[72] Inventor: Walter C. Gordon, Arcadia, Fla.
[73] Assignee: DeSoto Chemical Co., Inc., Arcadia, Fla.
[22] Filed: Sept. 2, 1969
[21] Appl. No.: 854,622

[52] U.S. Cl. ................................................43/131, 43/107
[51] Int. Cl. .....................................................A01m 25/00
[58] Field of Search .............................43/124, 131, 107, 65

[56] References Cited

UNITED STATES PATENTS

| | | | |
|---|---|---|---|
| 999,106 | 7/1911 | Hagaman et al. | 43/65 X |
| 1,352,067 | 9/1920 | Keyser | 43/131 |
| 1,566,199 | 12/1925 | Gaskins, Jr. | 43/131 |
| 1,631,121 | 6/1927 | Eckl | 43/131 |
| 2,009,305 | 7/1935 | Vinson | 43/131 |

Primary Examiner—Aldrich F. Medbery
Attorney—Mason, Fenwick & Lawrence

[57] ABSTRACT

An insecticide apparatus comprising a substantially tubular housing having an open end and including a chemical exterminating means such as lead arsenate and a resilient flexible guard which must be squeezed to permit insertion into the open end of the tubular housing, and which is positioned over the chemical exterminating means to prevent the chemical exterminating means from being easily removed or improperly accessible either accidentally or intentionally by other than insects. A guard-holding lip is also positioned and projects across the portion of the open end to retain the guard in place after release. The guard may be made of any suitable plastic or other material which is flexible and resilient.

10 Claims, 7 Drawing Figures

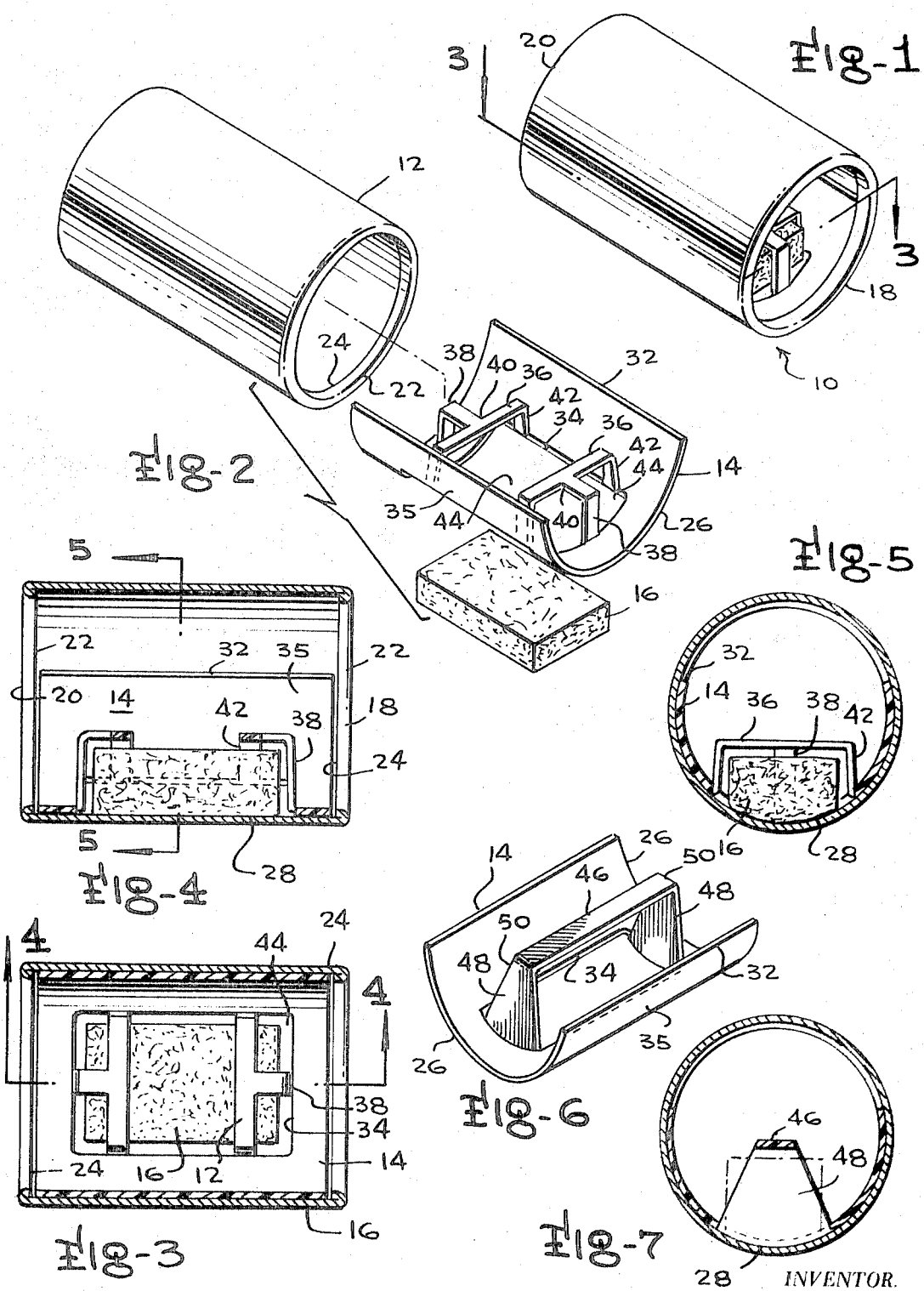

INSECTICIDE APPARATUS

The present invention relates generally to an insecticide apparatus. More particularly, the present invention is concerned with an insecticide apparatus which includes a chemical exterminating material and is provided with a resilient guard to protect the chemical exterminating means from being easily removed or undesirably accessible by animals either intentionally or accidentally.

In U.S. Pat. No. 1,566,199, a roach exterminator apparatus means is described that is similar to the roach exterminators presently being sold commercially. Essentially, this roach exterminator includes a tubular body formed of spirally twisted cardboard within which is positioned a chemical exterminating means in the form of a bait which usually includes, as the active ingredient, lead arsenate in an active amount between 15 and 20 percent, the remainder being inert binder materials of no biological activity but which attract the insect to the bait. The chemical exterminating means may be adhesively secured to the bottom of the tubular body—usually by its characteristically adherent nature. This combination of the chemical exterminating means and the tubular body forms the roach exterminator and is designed to be placed in any room where insects such as roaches, silver fish, water bugs, crickets, and the like, are usually seen. It is found that the insects are attracted to the chemical exterminating means and, after the insects have taken the bait, they have been found to return to their particular hideaways to die in a short period of time.

This product has been proven to be successful for many decades and will undoubtedly continue to provide effective extermination of various insects in the face of numerous organic insecticides previously known or yet to be developed. It is well known that many of the previously considered safe organic insecticides are today being reexamined for safe use in our environment, while new insecticides are being given far greater scrutiny than ever before. Not only are the basic characteristics of the insecticide considered, but frequently it is the manner of application of the insecticide necessary to bring about the effective contact between the insecticide and the insect that may raise a question of the safest possible use.

In order to avoid any serious questions of safety for a chemical composition that has been in accepted safe use for decades such as the lead arsenate bait, further protection against intentional or purposeful acts by animals or children to gain access to the chemical composition is considered to be desirable. Increased safety of the chemical composition would enhance the already more than acceptable public safety record established through many years of safe use.

It is therefore the principal object of the present invention to provide means for protecting against accidental or purposeful undesirable access to the chemical composition forming the chemical exterminating means or bait.

A further object of the present invention is to provide a guard covering the chemical exterminating means which will prevent accidental or purposeful undesirable access to or removal of the chemical exterminating means, and yet not hinder in any way the necessary access to the chemical exterminating means by the insects desired to be killed by the insecticide apparatus.

A further object of the present invention is to provide a guard which will be simple and easy to insert into the housing containing the chemical exterminating means, and will be retained therein even against intentional attempts to remove in toto or partially the chemical composition forming the insecticide.

It is another object of the present invention to provide a simple easy-to-install guard of a resilient flexible nature which is held in place within a tubular body to protect a chemical insecticide against improper access.

These and other objects of the present invention will become more apparent upon a careful reading of the following specification and accompanying drawings in which FIG. 1 is a perspective view of the insecticide apparatus of the present invention.

FIG. 2 is an exploded perspective view of the basic elements forming the combination of the insect apparatus.

FIG. 3 is a cross-sectional view taken along the lines 3—3 of FIG. 1 illustrating the guard in place to protect the chemical insecticide from undesired access.

FIG. 4 is a cross-sectional view taken along the lines 4—4 of FIG. 3 illustrating the circumferential extent of the guard in relationship to the tubular housing.

FIG. 5 is a cross-sectional view taken along the lines 5—5 of FIG. 4.

FIG. 6 is a perspective view of a modified guard for the chemical insecticide.

FIG. 7 is a view similar to FIG. 5 illustrating the modified guard of FIG. 6 in place in the tubular housing.

The numeral 10 in FIG. 1 designates the combination of elements which is referred to as the insecticide apparatus of the present invention. Essentially, the components forming the insecticide apparatus 10 include the tubular housing 12, the resilient flexible guard 14, and the chemical exterminating means or insecticide 16 combined for use as the insect bait.

The tubular housing 12 may be composed of any suitable material such as paper or cardboard or plastic material such as the polyvinyl resins. However, generally for economical reasons the body is formed of cardboard twisted spirally in a manner well known in the construction of roller tubes for paper tissues and the like. It should be understood that the manner of construction of the tubular housing is not critical, nor is the particular shape critical although it has been found preferable, again for economical reasons, to utilize a cylindrically shaped tube. However, any tubular form that is hollow and elongated, regardless of the cross-sectional shape, may be utilized. The cylindrical tubular shape does have the advantage, however, that the chemical insecticide 16 will always be positioned at the bottom of the housing due to the weight component of the insecticide itself which forces the tubular housing 12 to take the position as shown in FIG. 1.

The tubular housing 12 is formed with similar open ends 18 and 20 to permit the ingress of the insects and their access to the chemical insecticide 16. The tubular housing may be of any size; however, it is found that sizes from 1 to 3 inches long and from ¾ to 2 inches in outside diameter are entirely acceptable to admit the insects of the size usually encountered. Actually, the size is not critical and is determined solely by the size of the insect to be killed and the surrounding space available to position the insecticide apparatus 10.

The open ends 18 and 20 are preferably provided with an inturned circumferential lip 22 which narrows the diameter of the open end and is important to provide the means for holding the resilient guard 14 in place after it has been inserted into the tubular housing 12. It is not essential for the lip 22 to be continuous, merely that it protrude inwardly to narrow the diameter of the open ends 18 and 20 and provide an abutting surface 24 which will abut the complementary-shaped edge or rim 26 of the guard 14 as best shown in FIG. 2 and FIG. 3.

The chemical insecticide may be any insecticide composition which will first attract insects through color or odor or other stimuli and kill them upon contact or ingestion of the insecticide. The insecticide usually found to be very efficient for this purpose is lead arsenate mixed with a binder that may be a mash or gum or other insect-attracting composition well known in the art. The type of insecticidal bait 16 that has been sued by the DeSoto Chemical Company, Inc., of Arcadia, Florida, in its commercial product is entirely satisfactory.

The chemical insecticide 16 is usually secured to the bottom of the tubular housing as at 28 by reason of its characteristically adherent nature. The body of the insecticide combination is usually sufficiently plastic to conform to the bottom of the housing as well as tacky or sticky to be self-securing to the inner surface of the housing. It is to be understood that self adhesion or any adhesion of the insecticide 16 to the housing is not a critical or essential aspect of the present invention.

The guard 14 as best shown in the exploded view of FIG. 2 is preferably provided with a shape generally conforming to the interior of the tubular housing, although the particular shape is not critical to the invention. As shown, the guard 14 is an elongated portion of a cylindrical tube which, in cross section along edge 26, is somewhat greater than semicircular in circumference, and in length along flat edge 32 the guard is slightly shorter than the overall length of the housing 12, but within the opposed lips 22 at opposite ends 18 and 20, as may be seen from FIGS. 3 and 4. In unstressed condition, the guard is of slightly greater cross-sectional diameter than the diameter of the open ends 18 and 20.

The guard 14 is preferably made of a resilient flexible springy-type material such as one of the plastic materials including, but not limited to, polyethylene, polypropylene, polyvinyl chloride, polyvinyl acetate, polystyrene, polybutadiene, polyacrylonitrile, urea-formaldehyde condensate, or copolymers thereof, or the like, as well as a metal or flexible paperboard. Resiliency and flexibility are important since the guard must be compressed by sidewise diametrical pressure to enable it to be inserted into the tubular housing through the open ends 18 and 20 narrowed by the lips 22. It should be noted, however, that the material used for the guard is not critical provided it is of a springy resilient nature.

To be positioned on the inside of the tubular housing, the guard must be squeezed with sidewise pressure usually with the insecticide received within the guard held in an inverted (convex upwardly) position. The cutout 34 in the bottom of the guard 14, as best shown in FIGS. 2 and 3, surrounds the sides of the insecticide. Once inside the tubular housing 12, the guard containing the insecticide is no longer subjected to the compression and is released. The curved sides 35 of the guard are forced against the sides of the tubular housing 12 and held from removal as its end edge 26 abuts the abutting surface 24 of the lip 22. The insecticide is thus held in place within the guard upon release of the guard.

To prevent undesired access to the chemical insecticide, cross bars 36,36 are superposed over the cutout portion 34 and are supported by front and rear L-shaped struts 38,38 which are connected to the cross bar 36 at 40. Feet 42 support the ends of the crossbar 36. The bottoms of the L-shaped struts 38 and the feet 42 may be suitably connected at their bases to the guard 14 adjacent the edges of the cutout 34, and in this manner support the cross bar 36 while providing openings 44 whereby the insects have convenient access to the insecticide 16.

In FIG. 6, there is shown a modified embodiment of the guard 14 and is provided with the same basic features. The curved sides include the cutout 34, the end edges 26, and the flat upper edges 32 in the manner precisely as described previously. The cross bar means is somewhat different and, as shown, includes a single superposed bar 46 extending the length of the cutout 34 and is supported by a truncated cone-shaped base 48 on either end of the cross bar 46 where they are made integral at 50.

As can be seen from the foregoing, the chemical insecticide 16 is positioned within the interior of the inverted guard 14. The guard 14 is then compressed by applying diametrical compressive force along the flat edges 32, and the entire guard containing the insecticide is inserted into the tubular housing 12. The inherent and natural springiness and resiliency of the guard will snap the guard walls 35 against the interior sidewalls of the housing 12 upon release. The guard and the contained and protected insecticide will be retained in the housing by the abutting surfaces 24 of the lip 22 and edge 26 of the guard, and cannot be removed by animals or children; nor can there be easy access to the chemical insecticide by humans or pets. Importantly, however, there is no bar to the insects which may easily move into the open ends 18 and 20 and pass through the openings 44 to eat of the deadly insecticide.

From the foregoing detailed description it will be evident that there are a number of changes, adaptations and modifications of the present invention which come within the province of those skilled in the art; however, it is intended that all such variations not departing from the spirit of the invention be considered as within the scope thereof as limited solely by the appended claims.

I claim:

1. An insecticide apparatus comprising a substantially tubular housing having an open end, a chemical exterminating means positioned adjacent the inner surface of and within said housing, a resilient guard positioned over and covering said chemical exterminating means and within said housing, said guard having an enclosure means including a plurality of openings therein containing said chemical exterminating means and providing insect access to said chemical exterminating means through said guard opening, said guard being of flexible, resilient material and in expanded unstressed condition before insertion into said housing being of a cross-sectional width greater than the diameter of said open end whereby said guard must be contracted to a stressed condition to pass through said open end and be positioned over said chemical exterminating means to protect said chemical exterminating means from being removed from said housing or against animal access.

2. The insecticide apparatus of claim 1 including guard holding means positioned at and projecting across said open end.

3. The insecticide apparatus of claim 2 including said guard holding means being an inwardly protruding lip positioned at said open end.

4. The insecticide apparatus of claim 1 including said guard having a circumference in cross section greater than semicircular.

5. The insecticide apparatus of claim 1 including said guard being composed of polyethylene, polypropylene, polyvinyl chloride, polyvinyl acetate, polystyrene, polybutadiene, polyacrylonitrile, urea-formaldehyde condensate, or the like.

6. The insecticide apparatus of claim 1 including said guard having a curved elongated base, a cutout portion in said base surrounding said chemical exterminating means, crossbar means superposed over said cutout, vertical supporting means connected to said base and said crossbar means to maintain said cross bar means positioned above said chemical exterminating means.

7. The insecticide apparatus of claim 9 including a guard holding means provided with an inwardly protruding lip positioned at said open end.

8. The insecticide apparatus of claim 1 includes a guard holding means, said guard holding means being an inwardly protruding lip positioned at said open end, said lip forming a reduced diameter at said open end smaller than the width of said guard.

9. The insecticide apparatus of claim 8 wherein said guard is provided with a curved elongated flexible and resilient base and a cutout portion in said base adapted to surround said chemical exterminating means.

10. The insecticide apparatus of claim 9 wherein said guard includes a crossbar means superposed over said cutout, vertical supporting means connected to said base and said crossbar means to maintain said crossbar means positioned above said chemical exterminating means.

* * * * *